July 30, 1946.   K. O. SISSON   2,405,063
COLLIMATOR
Filed Jan. 17, 1944
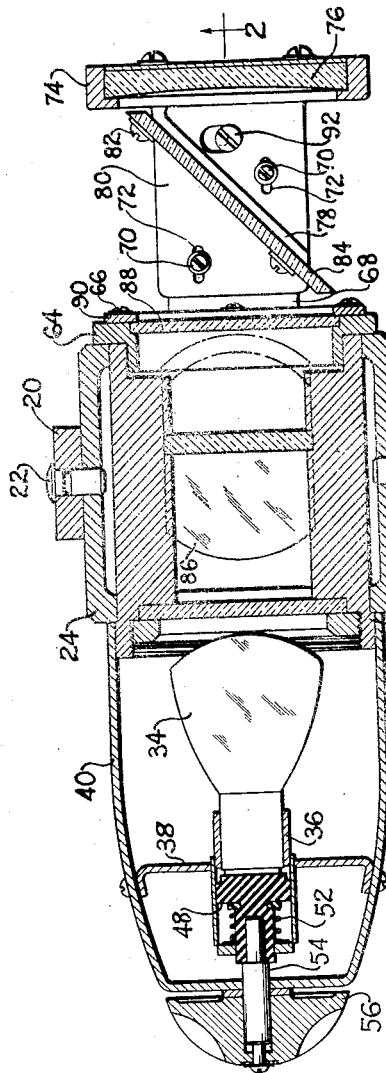
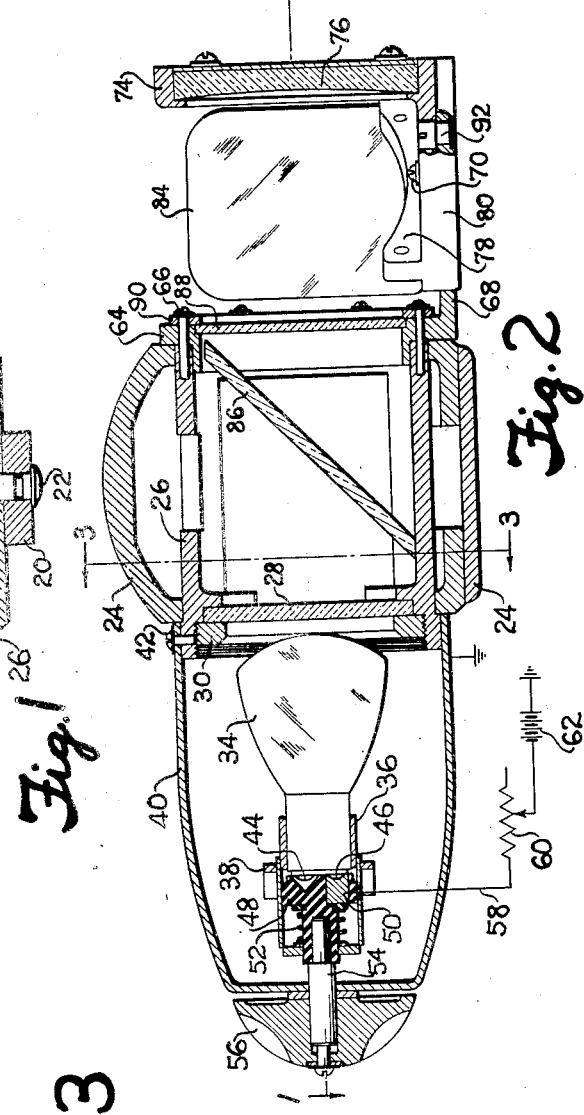
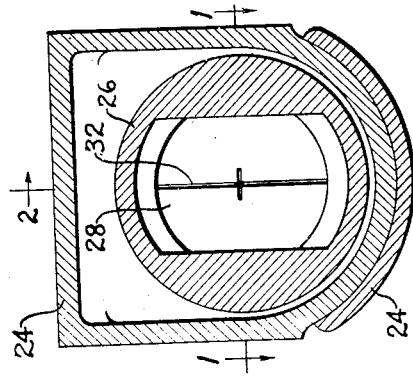
INVENTOR.
Kenneth O. Sisson
BY
Spencer Hardman and Fehr
attorneys Patented July 30, 1946

2,405,063

UNITED STATES PATENT OFFICE 2,405,063

COLLIMATOR

Kenneth O. Sisson, Oakwood, Ohio, assignor to General Motors Corporation, Dayton, Ohio, a corporation of Delaware Application January 17, 1944, Serial No. 518,630

2 Claims. (Cl. 88—2.3)

This invention relates to collimators of the reflecting type which may be used in aiming devices, particularly bombsights.

Collimators of the reflecting type have been used to determine a direction in aiming devices and other similar uses. In such collimators it is customary to use a concave mirror, an illuminated reticle substantially at the focal point of the mirror and a semi-reflecting optical glass plate between the mirror and the reticle positioned at any desired angle between about 15 degrees and 75 degrees to the axis of the mirror. In this arrangement, rays from the illuminated reticle extend through the glass plate to the mirror and are reflected from the mirror to the surface of the glass plate and then are reflected from the surface of the glass plate in parallel rays of light when the system is properly focused. In using the collimator, the line of sight is transverse to the axis of the mirror through the semi-reflecting glass plate to the object in the distance. By virtue of the collimation, the illuminated reticle appears as if placed on the object in the distance.

I have discovered in trying to properly focus this system, that it is impossible to collimate or make parallel the rays from all parts of the reflecting glass in such a system. It appears that the system may be focused so that the image will remain fixed on the object in the distance and the rays will be parallel as the eye is moved from top to bottom of the semi-reflecting glass; but when so focused and the eye is moved from left to right of the semi-reflecting glass the image will move with the eye with respect to the horizon and the rays will converge or diverge from left to right. The system may also be focused so that as the eye is moved from left to right, the image will remain fixed on the object in the distance, but when so focused and the eye is moved from top to bottom of the semi-reflecting glass the image will move with the eye.

It is an object of my invention to provide means in such a system so arranged that the image will not move when the eye is moved either from the top to bottom or left to right with respect to the semi-reflecting glass plate.

It is another object of my invention to provide means in the system so arranged that the rays will be perfectly collimated and parallel when reflected from any points on the reflecting glass plate.

It is another object of my invention to provide a correcting optical glass plate of such thickness and quality of refraction and positioned at such an angle that it will provide perfect collimation wherein all the rays reflected from any points on the semi-reflecting glass plate will be perfectly collimated and parallel.

I do not perfectly understand the theories regarding the difficulty in focusing the reflecting type of collimator or the correction I have discovered; but I believe that the difficulty may be caused by the refraction of the light rays passing through the semi-reflecting glass plate from the reticle to the mirror or it may be some condition analogous to astigmatism in photographic lenses. I have discovered that this difficulty in focusing may be corrected by placing between the reticle and the semi-reflecting glass plate a correcting glass plate having the same or equivalent properties of refraction positioned at the same angle to the axis of the mirror, but perpendicular to the reference plane from which the angle of the semi-reflecting glass plate is measured. Such a correction plate makes it possible to focus all of the rays reflected from the semi-reflecting glass plate in parallel lines at the same focal point.

Further objects and advantages of the present invention will be apparent from the following description, reference being had to the accompanying drawing, wherein a preferred form of the present invention is clearly shown.

In the drawing:

Fig. 1 is a sectional view taken along the line 1—1 of Fig. 2, showing a reflecting type collimator illustrating my invention;

Fig. 2 is a sectional view take along the line 2—2 of Fig. 1; and

Fig. 3 is a sectional view taken along the line 3—3 of Fig. 2.

Referring now to the drawing, there is shown, in order to provide a universal support for the collimator, a pivotal supporting yoke 20 provided with pivot pins 22. These pivot pins 22 pivotally support a holder 24. Rotatably mounted within this holder 24 is a sleeve 26. This rotatable sleeve 26 is provided with a glass plate 28 which is held in place against a flange on the sleeve 26 by means of a ring nut 30. This glass plate 28 is provided with a frosted surface on the side adjacent the light bulb 34 and on the opposite side, a blackened light excluding surface, with the exception of the fine inscribed vertical and horizontal cross hairs or lines 32 forming a reticle, in the black painted surface. These lines 32 may be of any desired configuration best accommodated to their use.

A light bulb 34 preferably about 50 C. P. with two alternative filaments, is provided upon the side of the plate opposite the black painted surface. The light from the bulb 34 illuminates the vertical and horizontal cross hairs to provide an illuminated reticle. This light bulb 34 is supported in a metal socket 36 which in turn is supported by a transverse metal support 38 extending to the casing 40. The casing 40 slips over the end of the sleeve 26 and is fastened by screws 42. The bulb 34 as is customary, has one of its terminals provided by the side wall on its base which fits into the socket 36. This wall on the base of the light bulb serves as the one terminal for both of the filaments in the bulb 34. The bottom of the base of the bulb 34 is provided with two terminals 44 and 46 which are insulated from each other, each being separately connected to the second terminal of one of the alternative filaments.

A very convenient and simple means is provided for rapidly changing the electrical connection from one of the filaments to the other in case one of the filaments should fail. This is done by providing a spring-pressed rotatable member 48 of insulating material in the bottom of the socket 36. This rotatable insulating member 48 carries a contact 50 which is adapted to make contact with one of the terminals 44 or 46 at one position. If the member 48 is rotated 180 degrees, the contact 50 will make contact with the other terminal in the base of the bulb 34. As shown in Fig. 2, the contact 50 is in contact with the terminal 46 while the rotatable member 48 is provided with a recess adjacent the terminal 44. A coil spring 52 is provided for holding the contact 50 in contact with the base of the light bulb 34. The light bulb 34 is held in its socket 36 by means of a pin in a bayonet slot arrangement as is customary with this type of bulb.

The rotatable member 48 is provided with a concentric pin 54 extending through the casing 40 and provided with a knob 56 at the end of the casing 40 so that the insulating member 48 may be rotated to place the contact 50 in engagement with the terminal 44 in order to change the energization of the light bulb 34 from one filament to the other. The contact 50 is connected by suitable conducting means, illustrated diagrammatically by the conductor 58, to a variable resistance 60 which in turn is connected to a suitable power source such as a battery 62 which, in turn is connected through grounding to the casing 40. By this arrangement the illuminated reticle 32 is provided with a dependable light source of controllable intensity.

The sleeve 26 is held from axial movement in the barrel 24 by a small shoulder at one end adjacent its connection with the casing 40 and by a flanged ring member 64 at the opposite end, fastened to the sleeve by the screws 66 and provided with a projecting arm 68. Mounted upon this projecting arm 68 by means of the screws 70 and the slots 72 is a ring-shaped supporting member 74. This ring-shaped supporting member 74 holds the concave reflecting mirror 76. Theoretically it would be preferable if this reflecting mirror 76 would be parabolic, but in practice I find that a spherical concave mirror within the limits employed here is quite satisfactory and moreover is much more readily ground by simple optical grinding machinery. The reflecting surface is on the concave face of the mirror and preferably is of metallic chromium suitably deposited thereon. The mirror is so placed that its focal point is substantially at the reticle 32 on the reticle plate 28. The ring-shaped member 74 is provided with a rib 78 upon its flanged supporting surface 80 which rests upon the projecting arm 68. Fastened to this rib by the screws 82 is the semi-reflecting glass plate 84 positioned at an angle of 45 degrees to the axis of the mirror 76 relative to the vertical plane but perpendicular to the horizontal plane.

Within the sleeve 26 I provide my correcting glass plate 86. This correcting glass plate is held by the walls of the sleeve 26 which are provided with grooves extending at 45 degrees to the axis of the sleeve which coincides with the axis of the mirror 76 and the light bulb 34. This correcting glass plate 86 is of the same thickness and the same type and same characteristics of glass as the semi-reflecting glass plate 84. It is positioned at an angle of 45 degrees to the horizontal plane and perpendicular to the vertical plane while the semi-reflecting glass plate 84 is positioned at an angle of 45 degrees to the vertical plane and perpendicular to the horizontal plane as mentioned above. Both of these reference planes are parallel to the axis of the mirror 76. If the semi-reflecting glass plate 84 is not positioned at an angel of 45 degrees to the axis of the mirror 76 then the correcting glass plate 86 should be positioned at the same angle to the axis of the mirror as the semi-reflecting glass plate 84, but this angle should be relative to the horizontal reference plane while the angle of the semi-reflecting glass plate should be relative to the vertical reference plane. However, it should be understood that the terms vertical and horizontal reference planes are merely used for convenience and that any planes parallel with the axis of the mirror and perpendicular to each other may be used as reference planes to locate the semi-reflecting glass plate 84 and the correcting glass plate 86. It should be understood that the collimator may be rotated or bodily moved to any position in space so that its parallel rays may be directed along any parallel paths.

If the correction glass plate 86 is not of the same thickness as the semi-reflecting glass plate 84 I believe it should have the same refraction characteristics as the semi-reflecting glass plate 84 when light passes through it at the same angle as through the plate 84. A thin glass window 88 held by the ring 90 may be provided in order to close the interior of the sleeve 26 to prevent dust from accumulating upon either the correction plate 86 or the reticle 32. With this arrangement, the rays from the reticle glass plate 28 will be refracted in two different directions in passing successively through the correcting glass plate 86 and the reflecting glass plate 84 and thereby their path will be offset downwardly and toward the observer before reaching the mirror 76. To correct this, the cross lines 32 of the reticle plate 28 preferably are displaced laterally in the opposite directions in amounts equal to said offsets so that the rays from the crossing point of the cross lines 32 will be directed after passing successively through both plates 86 and 84 along the axis of the mirror 76.

In my collimator, the light bulb lights the vertical and horizontal lines of the reticle 32 on the reticle glass 28. Light rays from these illuminated reticle lines 32 pass through the correction plate 86 and are refracted. They pass through window 88 without refraction and then pass though the semi-reflecting glass plate 84 and are again refracted. After passing through the semi-reflecting glass plate 84 the rays are reflected back by the mirror onto the near face of the semi-reflecting glass plate 84 and these rays are reflected from the plate 84 at an angle 90 degrees to the axis of the mirror in parallel or perfectly collimated rays when the system is properly focused. The system may be focused by moving the ring member 74 holding the mirror 76 toward or away from the reticle 32. This is the purpose of the screws 70 and the slots 72. The screws 70 may be loosened and the slotted eccentric pin 92 extending between the flanged support 80 and the projecting arm 68 may be turned to move the mirror 76 toward or away from the reticle 32 after which the screws 70 may be again tightened to preserve the adjustment.

In using the collimator the eye is directed through the semi-reflecting glass plate 84 substantially perpendicular to the axis of the mirror 76. The image of the illuminated reticle will appear fixed upon the object at a distance. Since all of the rays of light are parallel this image will determine a true aim or true direction. The illumination of the light bulb may be varied so that the image is of the proper brightness in proportion to the brightness of the object, so that best visibility of each may be obtained. By the use of my correction plate, I find that the collimator can be accurately focused so that in moving the eye either from top to bottom or from left to right across the semi-reflecting glass plate 84, the image of the reticle remains substantially fixed on the object in the distance and does not move any more than the actual movement of the eye across the plate 84. By providing this correcting glass plate 84 it is possible to use the reflecting type of collimator for accurate aiming and accurate determination of a direction.

While the form of embodiment of the invention as herein disclosed, constitutes a preferred form, it is to be understood that other forms might be adopted, as may come within the scope of the claims which follow.

What is claimed is as follows:

1. A collimator comprising a concave spherical mirror, an illuminated reticle positioned substantially on the axis of said mirror in its principal focal plane, a semi-reflecting transparent plate in the path of light between the reticle and said mirror positioned at an angle of 45 degrees with respect to a first reference plane parallel to the axis of the mirror and perpendicular to a second reference plane also perpendicular to the first reference plane and parallel to the axis of the mirror, and a second transparent glass plate positioned at an angle of 45 degrees to said second reference plane and perpendicular to the first reference plane, said glass plate having refraction characteristics equivalent to said semi-reflecting plate and being located in the path of light between the reticle and the semi-reflecting plate.

2. A collimator comprising a concave spherical mirror, an illuminated reticle positioned substantially in the principal focal plane of the mirror, a semi-reflecting transparent plate positioned in the path of light between the mirror and the reticle along the mirror axis at a certain acute angle with respect to a first reference plane parallel to the axis of the mirror and perpendicular to a second reference plane, said second reference plane being parallel to the axis of the mirror, but perpendicular to said first mentioned reference plane, a second transparent plate positioned in the path of light at the same acute angle with respect to the second reference plane and perpendicular to the first reference plane, said second plate having refraction characteristics equivalent to said semi-reflecting plate, said second plate being located between said reticle and said semi-reflecting plate.

KENNETH O. SISSON.